W. S. POTWIN.
Domestic-Boiler Bottom.

No. 64,142. Patented April 23, 1867.

Witnesses:

Inventor:

United States Patent Office.

W. S. POTWIN, OF CHICAGO, ILLINOIS, ASSIGNOR TO FRANK STURGES AND COMPANY, OF SAME PLACE.

Letters Patent No. 64,142, dated April 23, 1867.

BOTTOMS FOR CULINARY STEAMERS.

*The Schedule referred to in these Letters Patent and making part of the same.*

TO ALL WHOM IT MAY CONCERN:

Be it known that I, W. S. POTWIN, of Chicago, in the county of Cook, and State of Illinois, have invented a new and improved Steamer Bottom; and I do hereby declare that the following is a full, clear, and exact description thereof.

My invention consists in stamping the bottoms of culinary steamers from one piece of metal and at one operation, with ribs or beads projecting upwards from the surface, and with a channel projecting downwards, forming a deep groove around its outer edge. And to enable others skilled in the art to make and use my invention, I will proceed to describe its construction and operation, reference being had to the accompanying drawings forming a part of this specification, and to the letters of reference marked thereon.

Similar letters indicate like parts.

Figure 2:
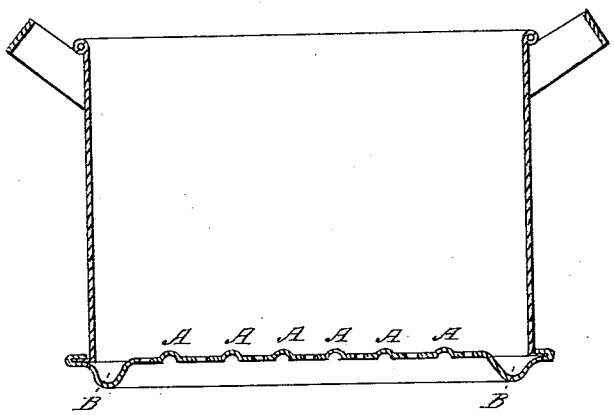
Figure 2 is a side view of the steamer.
Figure 1:
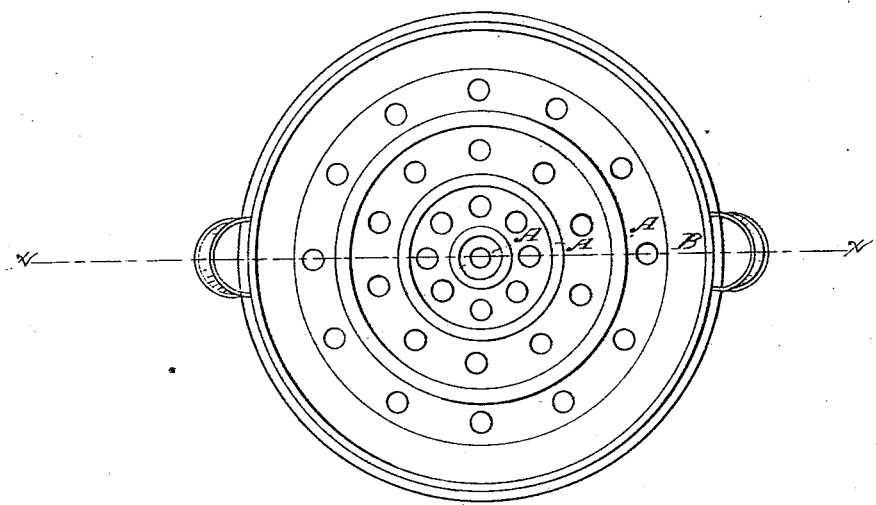
Figure 1 represents a top view of the steamer, showing the bottom attached.

A represents ribs or beads which project upwards into the steamer, and which form concentric rings around the bottom, as seen in the drawing. In steaming vegetables it is very important that the water and moisture should be drained off as much as possible to render them fit for the table, and it is difficult for this to be done when the vegetables lie flat upon the bottom of the steamer. I form these ribs or beads on my steamer bottom for the purpose of keeping the vegetables from lying flat on the bottom, and for raising them up from the bottom, so that the water contained in them may be drained off. But this is not the only advantage which I claim for this form of bottom, as it will at once be seen that these ribs serve to strengthen and stiffen the bottom, rendering it much less liable to bulge down and be destroyed than it would be without them. This is more important in a steamer bottom, as it is well known that the perforations through the bottom serve to weaken it. B is a deep channel or groove around the bottom projecting downwards. This projection forms the flange or guide which fits the boiler upon which the steamer is placed when in use.

Having thus described my invention, what I claim as new, and desire to secure by Letters Patent, is—

The bottom of the steamer, provided with the deep groove B near its outer edge, projecting downward and surrounding the raised centre, which is provided with the raised concentric ribs A, whereby perforated concentric channels are formed to drain the water formed by the steam condensed within the steamer from the articles being steamed, as herein shown and described.

The above specification of my invention signed by me this 28th day of August, 1866.

W. S. POTWIN.

Witnesses:
 BENEDICT BUYNALDSON,
 ALBERT V. AMET.